(12) United States Patent
Wahl et al.

(10) Patent No.: US 7,840,879 B2
(45) Date of Patent: Nov. 23, 2010

(54) WIRELESS MOBILE DEVICE

(75) Inventors: Volker Wahl, Toulouse (FR); Lydie Desperben, Toulouse (FR); Edwin Hilkens, Toulouse (FR); Stephane DeMarchi, Paris (FR); Khaled Maalej, Paris (FR); Jean Philippe Sibers, Paris (FR)

(73) Assignees: Freescale Semiconductor, Inc., Austin, TX (US); DIBCOM, Palaiseau (FR)

( * ) Notice: Subject to any disclaimer, the term of this patent is extended or adjusted under 35 U.S.C. 154(b) by 1025 days.

(21) Appl. No.: 11/569,933

(22) PCT Filed: May 30, 2005

(86) PCT No.: PCT/EP2005/052456

§ 371 (c)(1),
(2), (4) Date: Dec. 1, 2006

(87) PCT Pub. No.: WO2005/120042

PCT Pub. Date: Dec. 15, 2005

(65) Prior Publication Data

US 2008/0009251 A1    Jan. 10, 2008

(30) Foreign Application Priority Data

Jun. 2, 2004    (EP) ................................. 04291410

(51) Int. Cl.
*H03M 13/00*    (2006.01)
(52) U.S. Cl. ........................................ 714/776; 714/763
(58) Field of Classification Search .................. 714/776, 714/763
See application file for complete search history.

(56) References Cited

U.S. PATENT DOCUMENTS

| 5,450,409 | A | 9/1995 | Dillon et al. |
| 6,285,681 | B1* | 9/2001 | Kolze et al. .................. 370/442 |
| 6,430,233 | B1* | 8/2002 | Dillon et al. ................. 375/316 |
| 6,744,822 | B1* | 6/2004 | Gaddam et al. ............. 375/265 |
| 6,760,077 | B2* | 7/2004 | Choi et al. .................... 348/614 |
| 7,486,640 | B2* | 2/2009 | Borsos et al. ................ 370/331 |
| 7,613,112 | B2* | 11/2009 | Jyske et al. .................. 370/230 |
| 2006/0268726 | A1* | 11/2006 | Alamaunu et al. .......... 370/242 |
| 2006/0291386 | A1* | 12/2006 | Jyske et al. .................. 370/230 |
| 2007/0002871 | A1* | 1/2007 | Pekonen et al. ........ 370/395.42 |

(Continued)

FOREIGN PATENT DOCUMENTS

JP    2001339676    7/2001

(Continued)

OTHER PUBLICATIONS

Kwentus et al; "A Single-Chip Universal Digital Satellite Receiver with 480-MHz IF Input", IEEE Journal of Solid-State Circuits, vol. 34, No. 11, Nov. 1999.

(Continued)

*Primary Examiner*—M. Mujtaba K Chaudry

(57) ABSTRACT

A wireless mobile device comprising a tuner for converting a received radio frequency signal to a base band signal or intermediate frequency signal and providing the base band signal or intermediate frequency signal to a receiver, wherein the receiver is arranged to provide received data associated with the base band signal or intermediate frequency signal to an application processor for storage in memory, wherein the application processor is arranged to extract the data from memory in an interleaved form and perform error correction on the interleaved data.

20 Claims, 1 Drawing Sheet

U.S. PATENT DOCUMENTS

| | | |
|---|---|---|
| 2007/0198877 A1 | 8/2007 | Wahl et al. |
| 2007/0217356 A1* | 9/2007 | Kanno et al. ................ 370/328 |
| 2009/0055715 A1* | 2/2009 | Jashek et al. ................ 714/776 |

FOREIGN PATENT DOCUMENTS

| | | |
|---|---|---|
| WO | 0117147 A1 | 3/2001 |

OTHER PUBLICATIONS

Varada et al; "Data and Buffer Management in ATM Systems" 23rd Annual Conference on Local Computer Networks, 1998, USA.

Pan et al; "Design and Analysis of a Programmable Single-Chip Architecture for DVB-T Base-Band Receiver", IEEE Proceedings of the Design Automation and Test in Europe Conference and Exhibition, 2003.

* cited by examiner

WIRELESS MOBILE DEVICE

FIELD OF THE INVENTION

The present invention relates to a wireless mobile device and a method for error correcting within a wireless device.

BACKGROUND OF THE INVENTION

One digital video broadcasting standard that has been developed for TV sets and set-top boxes is the digital video broadcasting-terrestrial standard DVB-T.

A recent variation of the DVB-T standard that has been adopted to incorporate enhanced features to allow improved reception of digital video broadcasting services for mobile devices is the digital video broadcasting-handset DVB-H standard. One feature that has been incorporated within the DVB-H standard that facilitates this aim is the use of multi protocol encapsulated-forward error correction MPE-FEC. MPE-FEC allows recovery of data by a receiver in situations of high packet loss, which can occur when a receiver is in a changing environment, for example when a receiver is moving.

Associated with the use of MPE-FEC within a DVB-H system, however, is the need for a receiving device to be able to receive relatively large data frames, where each data frame corresponds to a MPE-FEC frame, to be able to perform interleaving of the data, Reed-Solomon error correction and associated deinterleaving of the data.

For example, a receiver operating within a DVB-H compatible system could receive a MPE-FEC frame with up to 2 Mbit (i.e. 250 kbytes) of data over a single channel in a relatively short time period, for example 200 millisecond. If a multi service environment existed additional channels may be required.

FIG. 1 illustrates a typical DVB-H compliant wireless mobile device 10 having a tuner 11 arranged to receive a radio frequency signal, for example a VHF or UHF signal, which is down converted to a base band signal and provided to a base band receiver 12. The receiver 12 is arranged to recover an MPEG-2 data transport stream from the received data, which involves storing a received MPE-FEC frame in a memory module 13 coupled to the receiver 12, and for the receiver 12 to extract interleaved data words from the memory and performing Reed-Solomon error correction on the data, where typically the receiver 12 will be a dedicated hardware module/chip (e.g. an ASIC) to achieve the processing speed required to perform the error correction. The error corrected data words are then placed back into the respective MPE-FEC frame in the memory module 13, the recovered MPEG-2 data stream is then passed to the wireless device's application processor 14, which is formed on a separate chip to that of the receiver 12, which demultiplexes and decodes the MPEG-2 transport stream and transfers the recovered data via the processor's 14 internet protocol stack to the application software, for example a media player 16.

However, this implementation results in additional memory being required by the receiver to store the received MPE-FEC frames, which can result in an increase in power consumption, an increase in cost and an increase in size of the mobile device.

It is desirable to improve this situation.

STATEMENT OF INVENTION

In accordance with a first aspect of the present invention there is provided a wireless mobile device in accordance with claim 1.

This provides the advantage of allowing memory associated with an application processor incorporated within the mobile device to be used to store received data, and to use resources on the same silicon chip as the applications processor to perform the Reed-Solomon error correction, thereby minimizing the need for additional memory associated with a base band receiver, and minimizing the data transfers between memory and the Reed-Solomon error correction.

In accordance with a second aspect of the present invention there is provided a method for error correcting data received by a wireless mobile device in accordance with claim 10.

BRIEF DESCRIPTION OF THE DRAWINGS

The present invention will now be described, by way of example, with reference to the accompanying drawings, in which.

DESCRIPTION OF PREFERRED EMBODIMENTS

Figure 1:
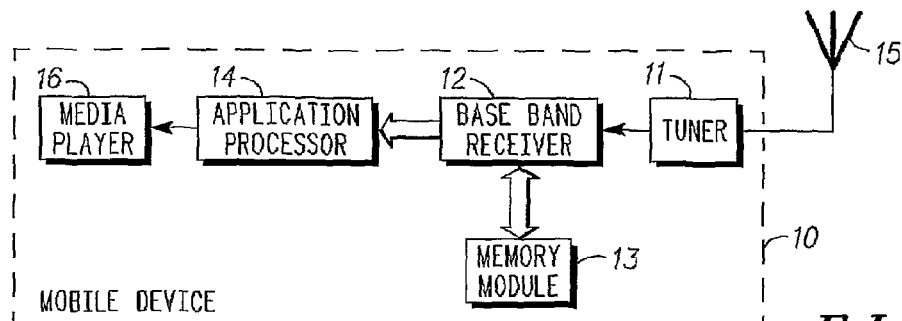
FIG. 1 illustrates a prior art DVB-H compliant wireless mobile device.
Figure 2:
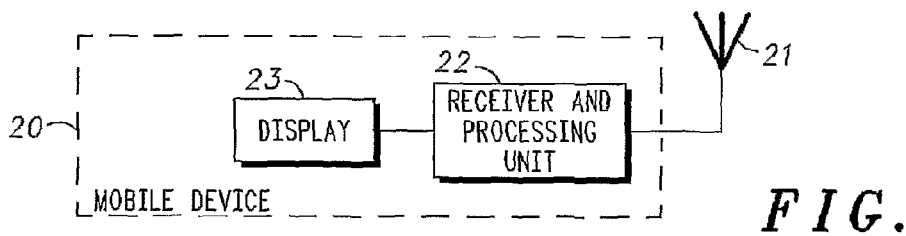
FIG. 2 illustrates a wireless mobile device according to an embodiment of the present invention.

FIG. 2 illustrates a wireless mobile device 20, which, for example, may be a radiotelephone, a personal digital assistant or a laptop computer.

The wireless mobile device 20 includes an antenna 21, for receiving radio frequency RF signals, that is coupled to a receiver and processing card 22. The receiver and processing card 22 is coupled to a display 23. The wireless mobile device 20 additionally includes other features common to the type of wireless mobile device being used, for example a keypad (not shown) and a speaker (not shown), as is well known to a person skilled in the art, and will not be discussed further within this embodiment.

Figure 3:
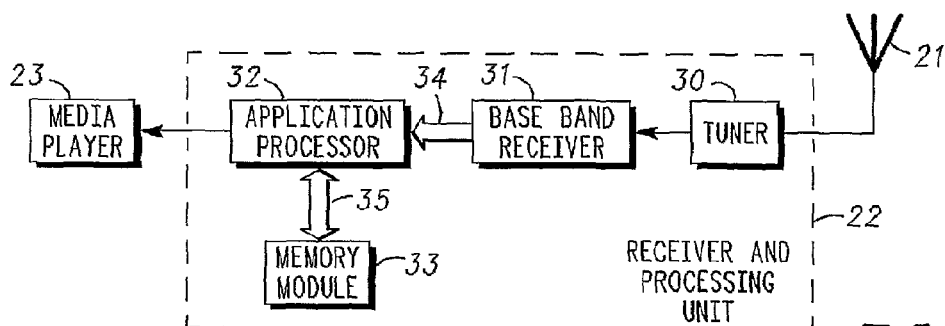
FIG. 3 illustrates a receiving and processing section of a wireless mobile device according to an embodiment of the present invention.

FIG. 3 illustrates the receiver and processing card 22 coupled to the antenna 21 and the display 23. The receiver and processing card 22 has a tuner 30, a base band receiver 31, an application processor 32 and a memory module 33, where the base band receiver 31 is a dedicated hardware element, for example an ASIC, and the application processor 32, which is formed on a separate silicon chip to that of the receiver 31, is responsible for handling the interface functions for the user, such as audio data, video data, and graphical and textual information services. The application processor 32 typically operates under instruction from application software code, as is well known to a person skilled in the art.

Figure 4:
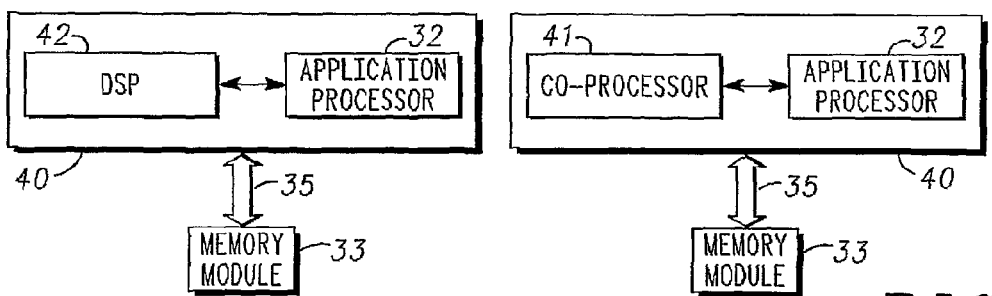
FIG. 4 illustrates an application processor arrangement of a wireless mobile device according to an embodiment of the present invention.

As shown in FIG. 4, for the purpose of this embodiment the silicon chip 40 on which the application processor 32 is formed additionally includes either a co-processor 41 or digital signal processor DSP 42, which are configured to support the functionality of the application processor 32 and improve the processing speed of the application processor. However, if the performance of the application processor is sufficient then a co-processor or DSP would not be required.

Within this embodiment the tuner 30, base band receiver 31 and application processor 32 are formed on separate silicon chips.

Although the tuner 30, base band receiver 31, application processor 32 and memory module 33 are located on a single card, for example a printed circuit board PCB, the individual elements can also be located on separate cards. Within this embodiment the tuner 30, base band receiver 31, the memory module and the application processor 32 are formed on separate silicon chips. However, the memory module can also be integrated with the application processor on a single silicon chip.

An input of the tuner 30 is coupled to the antenna 21 for receiving radio frequency signals, for example VHF and UHF transmission signals, where the tuner 30 is arranged to tune to a required frequency band. The tuner 30 down coverts a received signal to a base band signal or to an intermediate frequency IF signal, which is output from an output of the tuner 30 to an input of the base band receiver 31.

The MPE-FEC frames comprise MPEG-2 transport stream packets that are modulated onto a carrier frequency band. The MPEG-2 transport stream packets contain data sections that contain in most cases internet protocol IP packets, which in turn may contain compressed video data, compressed audio data or any other data like internet files. The MPEG-2 transport stream packets can also contain meta-information like program contents or other signalling information.

The base band receiver 31 converts the received base band signal or the IF signal into a data stream, which, as stated above, in this embodiment is an MPEG 2 transport stream. Additionally, the base band receiver 31 identifies MPE-FEC frames that contain errors by means of checksum values contained in the data stream, and by means of redundancy built into the data stream on transport layers underneath the MPEG2 transport stream and create associated error flags in the form of data elements.

The MPE-FEC frames and associated error flags are output from an output of the base band receiver 31 over a high speed unidirectional bus 34, for example at a bus transfer rate of 30 Mbits/sec, to the application processor 32.

The application processor 32 stores the received MPE-FEC frames in the memory 33 associated with the application processor 32, where the memory 33 will typically be coupled to the application processor 32 via a bidirectional bus 35. The memory 33 will typically be the main storage area for the wireless mobile device 22 and will be relatively large in size, for example in the order of 64 Mbytes, to provide storage support for different functions within the wireless mobile device 22, as is well known to a person skilled in the art.

The application processor checks 32 for error flags generated by the base band receiver 31. Additionally or alternatively, the application processor 32 could be arranged to perform error checking on the received data itself.

When a part of the MPE-FEC frame has an associated error flag/error the application processor 32 extracts the relevant part of the MPE-FEC frame in interleaved form from the memory 33 and performs error correction on the relevant part of the MPE-FEC frame where, in this embodiment, the co-processor 41 or DSP 42 are arranged to execute the required Reed-Solomon algorithm to perform MPE-FEC error correction.

Once the application processor 32 has with, if necessary, the support of the DSP 42 or co-processor 41 completed error correction on the erroneous part of the MPE-FEC frame the application processor 32 stores the corrected data in memory 33, where typically the corrected data is stored in deinterleaved form. This process is repeated by the application processor 32 for all erroneous, or potentially erroneous, parts of a received MPE-FEC frame, until the whole MPE-FEC frame has been corrected.

Once all the relevant parts of the MPE-FEC frames have been corrected the application processor 32 reads out from memory 33 the MPE-FEC frames. For the purpose of this embodiment the interleaving/deinterleaving technique specified in the DVB-H standard is used, however, other forms of interleaving/deinterleaving could be used.

The above embodiment has the advantage of allowing the base band receiver 31 to be powered down once data received from a data burst has been provided by the base band receiver 31 to the application processor 32 until another data burst is received.

Additionally, the above embodiment has the advantage of only requiring a unidirectional data link between the base band receiver 31 and the application processor 32, thereby reducing system complexity and power consumption and allowing MPE-FEC processing to be handled locally, without traversing silicon chip boundaries.

The data stream extracted by the application processor 32 is input into the internet protocol IP stack of the application processor software, where user application software such as a media player application, or other information and entertainment applications, running on the application processor 32 will retrieve the data stream to allow, for example playback of the received video stream on the display 23.

Although the above embodiment describes error correction being performed by a wireless mobile device 22 on data received within a DVB-H compliant system the above principles could equally be applied to error correction for other data transmission systems.

The invention claimed is:

1. A wireless mobile device comprising:
a tuner for converting a received radio frequency signal to a base band signal or intermediate frequency signal and providing the base band signal or intermediate frequency signal to a receiver, the receiver arranged to identify multi protocol encapsulated forward error corrected frames and arranged to provide received data associated with the base band signal or intermediate frequency signal to an application processor, for storage in memory, wherein the application processor is arranged to extract the data from memory in an interleaved form and perform multiprotocol encapsulation-forward error correction(MPE-FEC) on the interleaved data that contain errors.

2. A wireless mobile device according to claim 1, wherein the application processor is formed on a separate silicon chip to that of the receiver.

3. A wireless mobile device according to claim 1, wherein the receiver identifies multi protocol encapsulated forward error corrected frames that contain errors by use of checksum values contained in the data stream.

4. A wireless mobile device according to claim 1, wherein the receiver identifies multi protocol encapsulated forward error corrected frames that contain errors by means of redundancy built into the data stream on transport layers underneath an MPEG2 transport stream.

5. A wireless mobile device according to claim 1, wherein the receiver is arranged to create associated error flags in the form of data elements in response to identifying MPE-FEC frames that contain errors.

6. A wireless mobile device according to claim 1, wherein MPE-FEC frames and/or associated error flags are output from an output of the receiver over a high speed unidirectional bus to the application processor.

7. A wireless mobile device according to claim 1, wherein in response to identifying MPE-FEC frames that contain errors the application processor extracts a part of the MPE-FEC frame in interleaved form from the memory.

8. A wireless mobile device according to claim 7, wherein the application processor is arranged to execute a Reed-Solomon algorithm to perform MPE-FEC error correction on the part of the MPE-FEC frame.

9. A wireless mobile device according to claim 1, wherein the received data is compliant with the digital video broadcasting handset DBV-H standard.

10. A wireless mobile device according to claim 1, wherein the application processor includes a co-processor for performing the error correction.

11. A wireless mobile device according to claim 1, wherein the application processor includes a digital signal processor for performing the error correction.

12. A wireless mobile device according to claim 1, wherein the wireless mobile device is a radiotelephone.

13. A wireless mobile device according to claim 1, wherein the wireless mobile device is a personal digital assistant.

14. A wireless mobile device according to claim 1, wherein the wireless mobile device is a laptop.

15. A method for error correcting data received by a wireless mobile device comprising:
  receiving a radio frequency signal;
  converting the received radio frequency signal to a base band signal or an intermediate frequency signal;
  providing the base band signal or intermediate frequency signal to a receiver for processing of the base band signal or intermediate frequency signal;
  identifying multi protocol encapsulated forward error corrected frames;
  passing data associated with the processed base band signal or intermediate frequency signal from the receiver to an application processor for storage in memory;
  extracting the data from memory in an interleaved form; and
  providing the interleaved data to the application processor to perform multiprotocol encapsulation-forward error correction (MPE-FEC) on the interleaved data that contain errors.

16. A method for error correcting data received by a wireless mobile device according to claim 15, wherein the application processor is formed on a separate silicon chip to that of the receiver.

17. The method of claim 15, wherein the wireless mobile device is a radiotelephone.

18. The method of claim 15, wherein the wireless mobile device is a personal digital assistant.

19. The method of claim 15, wherein the wireless mobile device is a laptop.

20. The method of claim 15, wherein identifying multi protocol encapsulated forward error corrected frames comprises identifying multi protocol encapsulated forward error corrected frames that contain errors by use of checksum values contained in a data stream.

* * * * *